US012669449B2

(12) United States Patent
Duchene et al.

(10) Patent No.: US 12,669,449 B2
(45) Date of Patent: Jun. 30, 2026

(54) TOMOGRAPHIC ANALYSIS METHOD FOR DETECTING ANOMALIES

(71) Applicant: SAFRAN AIRCRAFT ENGINES, Paris (FR)

(72) Inventors: Pierre Alfred Jean Duchene, Moissy-Cramayel (FR); Harmonie Celestin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 164 days.

(21) Appl. No.: 18/715,816

(22) PCT Filed: Dec. 1, 2022

(86) PCT No.: PCT/FR2022/052210
§ 371 (c)(1),
(2) Date: Jun. 3, 2024

(87) PCT Pub. No.: WO2023/099846
PCT Pub. Date: Jun. 8, 2023

(65) Prior Publication Data
US 2025/0035567 A1      Jan. 30, 2025

(30) Foreign Application Priority Data

Dec. 3, 2021    (FR) ...................................... 2112964

(51) Int. Cl.
*G01N 23/046*          (2018.01)
*G01N 23/18*            (2018.01)
(Continued)

(52) U.S. Cl.
CPC .......... *G01N 23/18* (2013.01); *G01N 23/046* (2013.01); *G06T 7/11* (2017.01); *G06T 15/00* (2013.01);
(Continued)

(58) Field of Classification Search
CPC .... G01N 23/04; G01N 23/043; G01N 23/046; G01N 23/083; G01N 23/087;
(Continued)

(56) References Cited

U.S. PATENT DOCUMENTS 4,989,225 A * 1/1991 Gupta .................. G01N 23/046
                                                               378/58
6,041,132 A * 3/2000 Isaacs .................. G01N 23/046
                                                               600/407

(Continued)

FOREIGN PATENT DOCUMENTS

FR            3 050 826 A1    11/2017

OTHER PUBLICATIONS

International Search Report mailed Mar. 2, 2023, issued in corresponding International Application No. PCT/FR2022/052210, filed Dec. 1, 2022, 7 pages.

(Continued)

*Primary Examiner* — Allen C. Ho
(74) *Attorney, Agent, or Firm* — CHRISTENSEN O'CONNOR JOHNSON KINDNESS PLLC

(57)                   ABSTRACT

A method for the tomographic analysis detects anomalies in a part. The method includes the steps of acquiring at least one three-dimensional image of the part by means of a tomography device; subdividing the image into elementary subparts; analyzing a grayscale distribution in each subpart; obtaining at least one parameter representative of said grayscale distribution for each subpart; and comparing the one or more parameters obtained for each subpart with standard values characteristic of a defect-free region. The method further includes the steps of detecting abnormal subparts for which the one or more parameters differ from the standard values; determining risk regions, which comprise each abnormal subpart and each subpart adjacent to at (Continued)

least one abnormal subpart; and analyzing the risk regions in order to detect the anomalies in the part.

8 Claims, 3 Drawing Sheets

(51) Int. Cl.
    *G06T 7/11*          (2017.01)
    *G06T 15/00*       (2011.01)

(52) U.S. Cl.
    CPC ................ *G01N 2223/3307* (2013.01); *G01N 2223/401* (2013.01); *G01N 2223/403* (2013.01); *G01N 2223/63* (2013.01); *G01N 2223/66* (2013.01)

(58) Field of Classification Search
    CPC .......... G01N 23/18; G01N 2223/1013; G01N 2223/1016; G01N 2223/3307; G01N 2223/40; G01N 2223/401; G01N 2223/402; G01N 2223/403; G01N 2223/419; G01N 2223/63; G01N 2223/66
    USPC .............................. 378/10, 15, 19, 58, 62, 63
    See application file for complete search history.

(56) References Cited

U.S. PATENT DOCUMENTS

| | | | | |
|---|---|---|---|---|
| 6,366,636 | B1 * | 4/2002 | Kamimura | G01N 23/046 |
| | | | | 378/19 |
| 7,016,465 | B2 * | 3/2006 | Kamegawa | G01N 23/046 |
| | | | | 378/19 |
| 7,254,211 | B2 * | 8/2007 | Hunt | G01N 23/046 |
| | | | | 378/57 |
| 7,286,630 | B2 * | 10/2007 | Holt | G01N 23/046 |
| | | | | 378/20 |
| 8,208,711 | B2 * | 6/2012 | Venkatachalam | G01N 23/04 |
| | | | | 250/306 |
| 8,861,673 | B2 * | 10/2014 | Michaels | G01N 23/046 |
| | | | | 378/4 |
| 9,383,343 | B2 * | 7/2016 | Mitsumura | G01N 23/046 |
| 9,916,651 | B2 * | 3/2018 | Morard | G01N 23/046 |
| 10,402,678 | B2 * | 9/2019 | Morard | G06T 7/0004 |
| 10,520,453 | B2 * | 12/2019 | Monkawa | G01N 23/046 |
| 10,699,401 | B2 * | 6/2020 | Flessner | G01N 23/046 |
| 10,996,355 | B2 * | 5/2021 | Kimmig | G01N 23/046 |
| 11,127,154 | B2 * | 9/2021 | Mandel | G06T 7/70 |
| 11,253,215 | B2 * | 2/2022 | Erler | G01N 23/046 |
| 11,480,533 | B1 * | 10/2022 | Schiefelbein | G01N 23/18 |
| 11,719,651 | B2 * | 8/2023 | Stiebeiner | G01N 23/046 |
| | | | | 378/19 |
| 11,927,586 | B2 * | 3/2024 | De Beenhouwer | G01N 23/046 |
| 12,086,923 | B2 * | 9/2024 | Stiebeiner | G01N 23/046 |
| 12,347,115 | B2 * | 7/2025 | Brion | G06T 15/08 |
| 12,379,332 | B2 * | 8/2025 | Marchal | G01N 23/083 |
| 2009/0066939 | A1 | 3/2009 | Venkatachalam et al. | |

OTHER PUBLICATIONS

Written Opinion mailed Mar. 2, 2023, issued in corresponding International Application No. PCT/FR2022/052210, filed Dec. 1, 2022, 5 pages.

Dakak Abdel Rahman et al., "Application des algorithmes d'intelligence artificielle a l'exploitation des donnees de tomographie de pieces de fonderie en alliage d'aluminium," La revue Forge et Fonderie, Jun. 2021, pp. 18-25, vol. 26, Retrieved from the Internet: https://www.ctif.com/fichiers/2021/07/ForgeFonderie26-pp18-25.pdf.

Dakak Abdel Rahman et al., "Tomographie X et deep-learning," Nov. 28, 2019, 18 pages, Retrieved from the Internet: https://www.ingenierie-at-1yon.org/wp-content/uploads/2019/09/CND_Innovants_TOMOGRAPHIE_V1.pdf.

Fuchs Patrick et al., "Defect detection in CT scans of cast aluminum parts: A machine vision perspective," Neurocomputing, Apr. 29, 2021, pp. 85-96, Elsevier.

\* cited by examiner

TOMOGRAPHIC ANALYSIS METHOD FOR DETECTING ANOMALIES

FIELD OF THE DISCLOSURE

The disclosure relates to a method for tomographic analysis of a mechanical part. The part is for example a portion of an aircraft, and more precisely of a turbomachine, such as a portion of a fan casing, a fan blade, or a portion of a fixed blade structure.

BACKGROUND

It is known to inspect structural mechanical parts using tomographic methods, for example radiographic or acoustic, in order to detect the presence of possible defects on the surface of and within the part.

These methods are reliable, non-invasive, and allow inspecting the interior of the parts, which allows quickly assessing the condition of the part and deciding on its potential return to operation or its replacement.

A tomographic measurement consists of scanning an observed object, here a mechanical part, using a wave beam, and measuring the transmitted beam in all directions in order to reconstruct a three-dimensional image of the object.

FIG. 1 illustrates a tomography device 1 during the inspection of a mechanical part 20. Tomography device 1 comprises at least one transmission device 3, configured to emit an incident beam 5 of wave pulses towards part 20, for example radio frequency waves, X-rays, or acoustic waves, and at least one receiver 7 configured to capture a transmitted wave beam 9, these being arranged one on either side of part 20.

Part 20 is generally mounted on a support 11 rotating around an axis A, in order to be observed from all directions during the tomographic measurement.

Part 20 observed by tomography may be made of a composite material, as shown in detail in FIG. 2, or of a metal material.

Such a composite material comprises weft fibers 21 and warp fibers 22 interwoven in a weave plane P, or in several weave planes P superimposed in a thickness direction Z. Fibers 21 and 22 may be carbon fibers, glass fibers, or a mixture of the two. They are embedded in a matrix 23 comprising for example one or more polymers and/or resins, which solidify to form the final part 20.

In the case of a metal material, it can be defined on the mesoscopic scale as a set of grains of material 32 linked together by grain boundaries 33, as shown in FIG. 3. Grains 32 are three-dimensional areas which can have various and varied shapes, with a preferred direction or orientation for grain 32, which can result in an orthotropic metal material.

The amplitudes of the transmitted wave beam 9 from the different observation angles are translated into grayscales in a processing device 13, and digital analysis allows reconstructing the volume of part 20. Processing device 13 comprises a computer.

Tomographic analysis then makes it possible to obtain a visual of the exterior and interior of the part 20. This type of inspection has the major advantage of enabling visualization within the thickness of the material and of the analyzed part, while being non-destructive and reliable. A human operator can then assess the quality of the part 20, by searching the three-dimensional image for the presence or absence of an anomaly or damage.

In what follows, the terms "non-compliance", "anomaly", "damage", "damaging actions" or equivalent terms are used interchangeably to designate a portion of the part where the mechanical properties of the part are locally degraded in comparison to those of a part in good condition.

There may also be a foreign body present in the material, such as a void (porosity) or a material that has erroneously entered the part during shaping. Such an anomaly may justify removing and replacing the part when its mechanical strength is compromised, or, depending on the case, may not prevent the part from functioning properly.

In the case of a composite material, there may also be an area where fibers 21, 22 are distended or broken.

In the case of a metal material, there may again be an area presenting porosities or a foreign body, boundaries of lower quality affecting the mechanical characteristics, or atypical grain sizes.

It is important to note that the detection and characterization of the size and shape of the anomaly is still currently left to the human operator. This step causes a significant delay, because it is necessary to clearly define the non-compliant area, and observation of the entire volume of the part is currently necessary in order to detect any anomalies.

SUMMARY

The disclosure aims to remedy these disadvantages, by providing a method for analysis that enables rapid detection of potential anomalies without requiring operator intervention, and without the risk of ignoring a potential anomaly.

To this end, the disclosure relates to a method for the tomographic analysis of a part in order to detect anomalies, the method comprising the following steps:

- acquiring at least one three-dimensional image of the part by means of a tomography device,
- subdividing the image into elementary subparts,
- analyzing a grayscale distribution in each subpart and obtaining at least one parameter representative of the grayscale distribution for each subpart,
- comparing the one or more parameters obtained for each subpart with ranges of standard values characteristic of a defect-free region and detecting abnormal subparts for which the one or more parameters are outside the ranges of standard values,
- determining risk regions, which comprise each abnormal subpart and each subpart adjacent to at least one abnormal subpart, and
- analyzing the risk regions in order to detect the anomalies in the part.

Such a method makes it possible to detect anomalies in a part in a reliable and non-invasive manner, with reduced intervention time for the operator during the step of analyzing the risk regions, without increasing the risk of missing an anomaly.

The subdividing step may comprise determining at least one standard dimension of the anomalies being looked for in the part, each subpart having dimensions between half the standard dimension and double the standard dimension.

The standard dimension is for example obtained based on previous test results stored in a database.

The dimensions of the subparts may comprise a height, a width, and a length of the subpart. Alternatively, each subpart may have dimensions of more than twice the standard dimension. Such a characteristic allows optimizing the size of the analyzed risk region according to the anomalies to be considered.

At least one of the parameters representative of the grayscale distribution may be chosen among the average, the maximum, and the minimum in the grayscale distribution for the subpart.

At least one of the parameters representative of the grayscale distribution may be chosen among the gradient, the divergence, and the curl of the grayscale distribution for the subpart. The comparison step may make use of at least one digital processing tool chosen among nearest neighbor analysis, classification tree analysis, support vector machine analysis, and neural network analysis.

Alternatively, the comparison step may consist of comparing the measured value with a range of standard values characteristic of a defect-free region, in order to determine whether or not the measured value is within the range.

The range of standard values characteristic of a fault-free value may be a range centered on a standard average value, and of an amplitude for example equal to 10% of this standard average value.

The part may comprise a woven composite material.

The composite material may be woven in a two-dimensional pattern. Such a material comprises warp fibers and weft fibers interwoven to form at least one weave plane, the fibers being embedded in a matrix.

The fibers may be in the form of independent weave planes pre-impregnated with uncured matrix and deposited on top of each other.

Alternatively, all weave planes may be put in place, for example in a mold, before injection of the uncured matrix.

Alternatively, the composite material may be woven in a three-dimensional pattern, with fibers extending in at least three non-coplanar directions, embedded in a matrix as above. Such a material is also known as "interlock".

The fibers of the woven composite material may comprise glass fibers and/or carbon fibers.

The matrix may comprise at least one polymer, in particular a thermosetting polymer, and/or at least one resin.

The part may comprise a metal material.

The part may be a turbomachine casing part, or a blade of a compressor rotor or stator or of a fan of a turbomachine.

DETAILED DESCRIPTION

Figure 1:
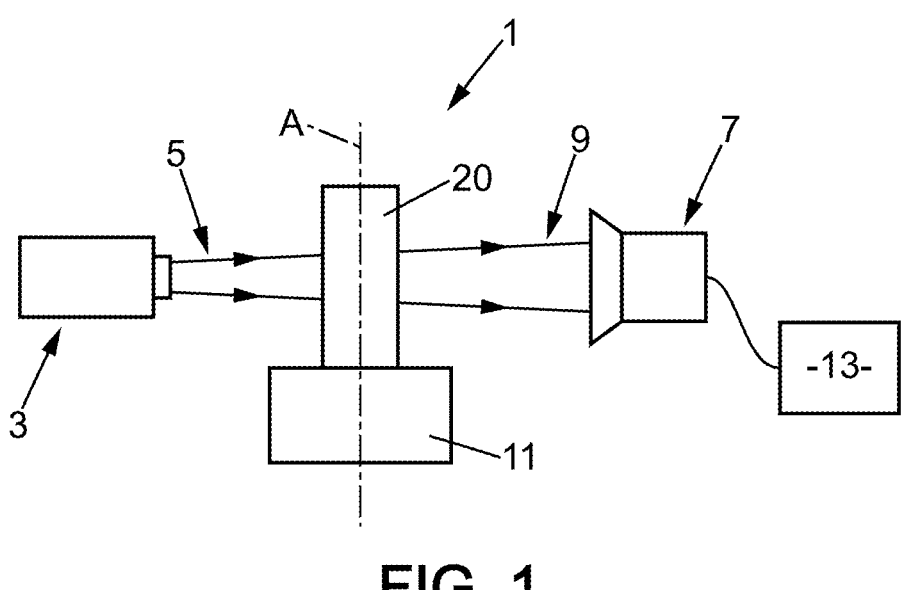
FIG. 1 is a schematic side view of a tomography device during the implementation of a method according to the disclosure.

A method for tomographic analysis according to the disclosure will now be described. This method makes use of the analysis device 1 described above, and aims to detect the presence of anomalies in a part 20, made for example of composite material or of metal material. The method comprises a first step of acquiring at least one three-dimensional image of part 20 by means of tomography device 1.

An incident beam 5 of wave pulses is emitted by transmitting device 3, towards part 20. Incident beam 5 is for example a beam of radiofrequency waves.

The waves pass through part 20, and a transmitted beam 9 coming from part 20 is captured by receiver 7. The obtained intensity distribution of transmitted beam 9 is converted into a two-dimensional grayscale image of part 20 by processing device 13.

Part 20 is rotated by means of support 11, and two-dimensional images of part 20 are acquired in all directions.

A three-dimensional grayscale image of part 20, or tomographic image, is then reconstructed through image processing by means of processing device 13.

Figure 2:
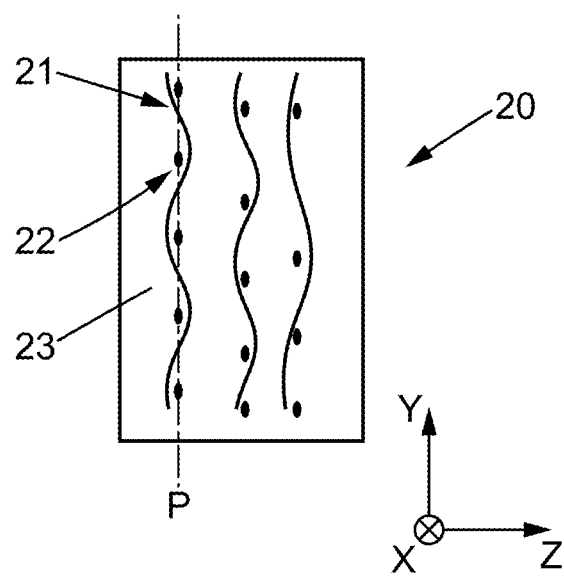
FIG. 2 is a schematic detailed view of a part made of woven composite material.
Figure 3:
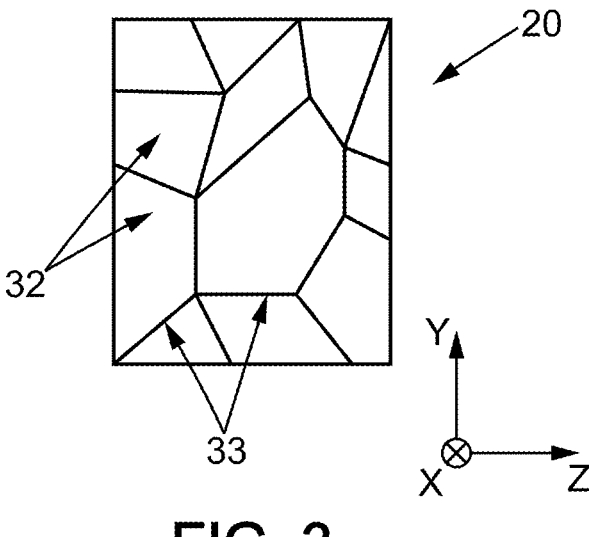
FIG. 3 is a schematic detailed view of a part made of metal material.
Figure 4:
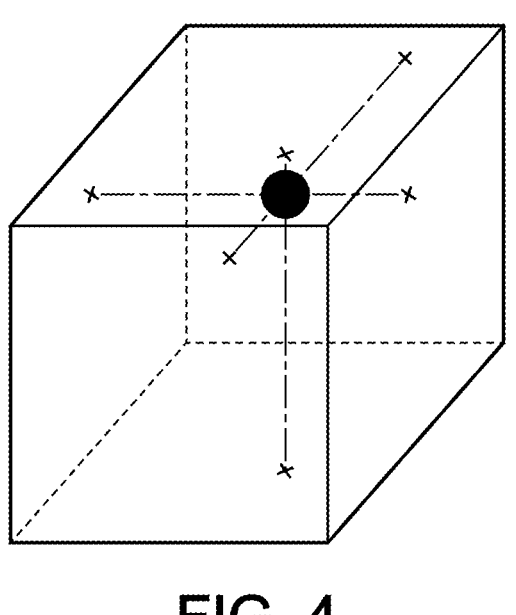
FIG. 4 is a schematic view of a three-dimensional image of a part comprising an anomaly.

In the example described, part 20 is a part made of composite material, as shown in FIG. 2.

The composite material comprises weft fibers 21 extending in a weft direction X and warp fibers 22 extending in a warp direction Y, embedded in a matrix 23. The average distance between two neighboring weft fibers 21 or warp fibers 22 is about 2 mm.

A thickness of part 20, measured in a thickness direction Z, is for example between 5 and 25 mm, in particular close to 10 mm for a part 20 comprising four to eight planes of superimposed weave planes. Weft fibers 21 and warp fibers 22 may be of the same or different materials (glass or carbon). Matrix 23 comprises at least one organic polymer and/or at least one resin. Woven composite materials can be considered as orthotropic materials, meaning materials having three planes of symmetry in their internal microstructure.

Alternatively, part 20 is composed of a metal material consisting of metal grains 32 and comprising boundaries 33 between grains 32. A thickness of the part measured in the Z direction is for example between 2 and 25 mm, in particular close to 7.5 mm. The metal material may be isotropic or orthotropic depending on its internal microstructure.

The method for analysis comprises a step of determining the standard dimensions of the anomalies being looked for in part 20.

The standard dimensions depend on the nature of the material, as well as on the acceptable threshold for degradation in part 20.

For example, in a part 20 intended for the aeronautical field, anomalies that are too small to cause sufficient degradation of the mechanical properties of part 20 are not taken into account.

An example of standard dimensions for the anomalies is 1 mm in all three directions X, Y, Z.

The method next comprises a step of subdividing the three-dimensional image into elementary subparts.

Figure 5:
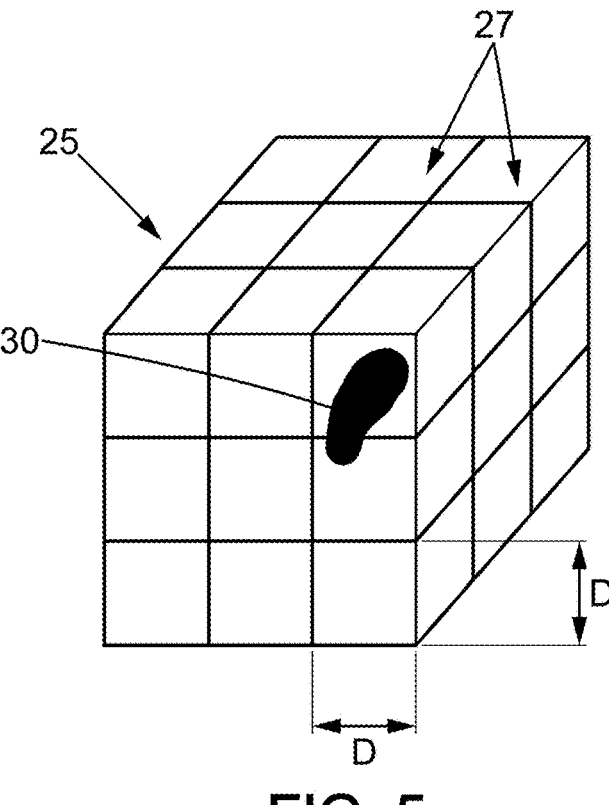
FIG. 5 is a schematic view of a step of subdividing the three-dimensional image of FIG. 4.

Such a three-dimensional image 25 subdivided into elementary subparts 27 is schematically represented in FIG. 5, where part 20 comprises an anomaly 30.

Elementary subparts 27 are for example cubic, with each side of a size D equal to the standard dimension of the anomalies being looked for.

Alternatively, the side of size D of subparts 27 is greater than the standard dimension of the anomalies being looked for, in particular twice as large.

The method comprises a step of analyzing the grayscale distribution in each subpart 27 and determining a value of at least one parameter representative of this distribution for each subpart 27.

Examples of representative parameters are: the average of the grayscale distribution, the maximum in the distribution, the minimum in the distribution, but also more complete mathematical operators such as the average gradient for the grayscale in subpart 27, or the grayscale curl and divergence in subpart 27. These parameters allow quickly obtaining a description of the grayscale distributions in each subpart 27.

The method then comprises a comparison step, during which the values of each representative parameter obtained for each subpart 27 are compared with the known values corresponding to subparts known to be without anomalies.

This comparison step may consist of a simple verification of the values of the analyzed parameter in relation to a range of values identified in defect-free regions of the material, or a more in-depth classification analysis.

In the case of a classification analysis, dedicated digital processing tools such as nearest neighbor analyses and classification trees may be used. If the volume of data is sufficient, analysis by support vector machine or neural networks may be implemented.

The comparison step then allows determining abnormal subparts 31 for which the values of the representative parameters differ from the values identified in the defect-free regions. Abnormal subparts 31 are indicated in FIG. 6 by cross hatching.

The method then comprises a step of determining risk regions, comprising all abnormal subparts 31, as well as each subpart 33 directly adjacent to at least one abnormal subpart 31.

Figure 6:
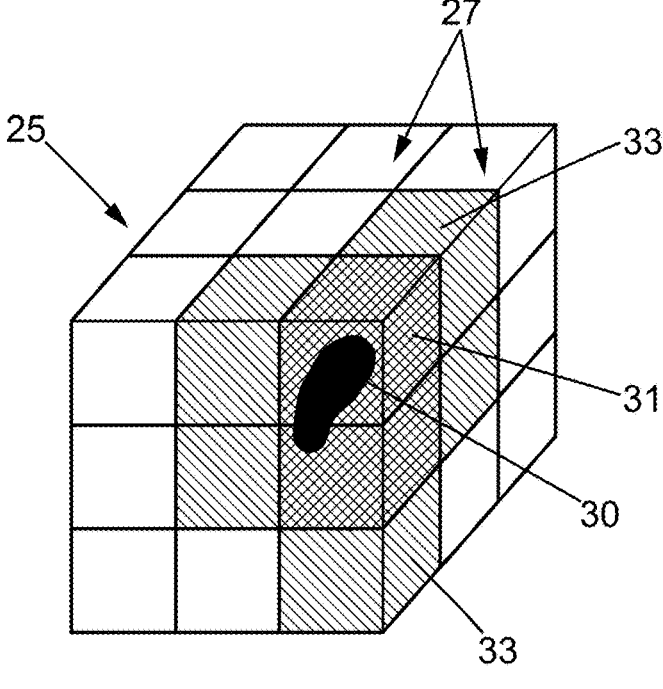
FIG. 6 is a schematic view of a step of analyzing the subdivisions of FIG. 5.

Subparts 33 directly adjacent to at least one abnormal subpart 31 are indicated by simple hatching in FIG. 6.

In this manner, the risk region is identified, with a margin around the identified abnormal subparts so as not to overlook any anomaly.

Subparts 27 which are not part of a risk region are excluded and classified as defect-free regions.

Risk regions are then manually inspected by an operator in order to detect anomalies in the part, while defect-free regions are not inspected, thus reducing the time of intervention by a qualified operator.

The invention claimed is:

1. A method for a tomographic analysis of a part in order to detect anomalies, the method comprising the following steps:

acquiring at least one three-dimensional image of the part by means of a tomography device, subdividing the at least one three-dimensional image into elementary subparts, analyzing a grayscale distribution in each subpart of the elementary subparts and obtaining at least one parameter representative of the grayscale distribution for each subpart, comparing the at least one parameter obtained for each subpart with standard values characteristic of a defect-free region and detecting abnormal subparts for which the at least one parameter differs from the standard values, determining risk regions, which comprise abnormal subparts and each subpart adjacent to at least one abnormal subpart, and analyzing the risk regions in order to detect the anomalies in the part.

2. The method according to claim 1, wherein the subdividing step comprises determining at least one standard dimension of the anomalies in the part, each subpart having dimensions between half the at least one standard dimension and double the at least one standard dimension.

3. The method according to claim 1, wherein the at least one parameter representative of the grayscale distribution for each subpart is selected from among an average, a maximum, and a minimum in the grayscale distribution for each subpart.

4. The method according to claim 1, wherein the at least one parameter representative of the grayscale distribution for each subpart is selected from among a gradient, a divergence, and a curl of the grayscale distribution for each subpart.

5. The method according to claim 1, wherein the comparing step comprises making use of at least one digital processing tool selected from among a nearest neighbor analysis, a classification tree analysis, a support vector machine analysis, and a neural network analysis.

6. The method according to claim 1, wherein the part comprises a woven composite material.

7. The method according to claim 1, wherein the part comprises a metal material.

8. The method according to claim 1, wherein the part comprises a turbomachine casing part, a blade of a compressor rotor, a stator, or a fan of a turbomachine.

* * * * *